United States Patent [19]

Lovett

[11] 3,772,751
[45] Nov. 20, 1973

[54] CONVEYOR ROLLER ASSEMBLY METHOD AND APPARATUS

[75] Inventor: William E. Lovett, Indianapolis, Ind.

[73] Assignee: Economation, Inc., Indianapolis, Ind.

[22] Filed: Apr. 13, 1972

[21] Appl. No.: 243,756

[52] U.S. Cl. ........ 29/148.4 D, 29/200 B, 29/243.52, 29/520, 193/37
[51] Int. Cl. ...................... B23p 19/00, B23p 11/00
[58] Field of Search ...................... 29/148.4 D, 520, 29/200 B, 243.52; 193/37

[56] References Cited
UNITED STATES PATENTS

| | | | |
|---|---|---|---|
| 378,412 | 2/1888 | Burkhardt | 29/520 X |
| 1,748,473 | 2/1930 | Fisk | 193/37 UX |
| 1,919,495 | 7/1933 | Allen | 193/37 |
| 2,165,379 | 7/1939 | Hiers | 29/200 B UX |
| 2,405,201 | 8/1946 | Franck | 29/520 UX |
| 2,429,293 | 10/1947 | Peck et al. | 29/520 UX |
| 2,593,069 | 4/1952 | Steinmetz | 29/148.4 D |
| 3,241,221 | 3/1966 | Kelzenberg | 29/200 B |
| 3,431,632 | 3/1969 | Wright | 29/243.52 X |

*Primary Examiner*—Charlie T. Moon
*Attorney*—Maurice A. Weikart

[57] ABSTRACT

Disclosed is a method and apparatus for clamping the conventional tube and shaft components of a conveyor roller in coaxial relation. The bearings are located on the shaft adjacent each end of the tube and inboard of the tube ends. Opposed forming dyes are then moved to contact the tube ends, folding or curving the tube end portions inwardly upon themseves with the reversely folded portions of the tube entering slightly the bearing housings. The end of the roller is thus formed and the bearings permanently locked to the tube in a single forming motion.

7 Claims, 7 Drawing Figures

United States Patent [19]
Lovett
[11] 3,772,751
[45] Nov. 20, 1973
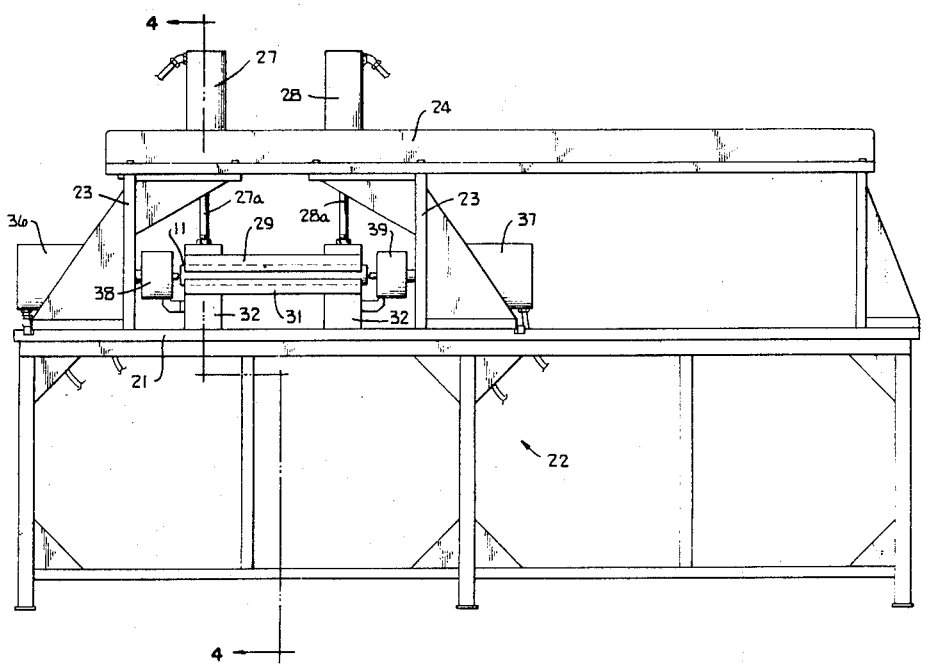
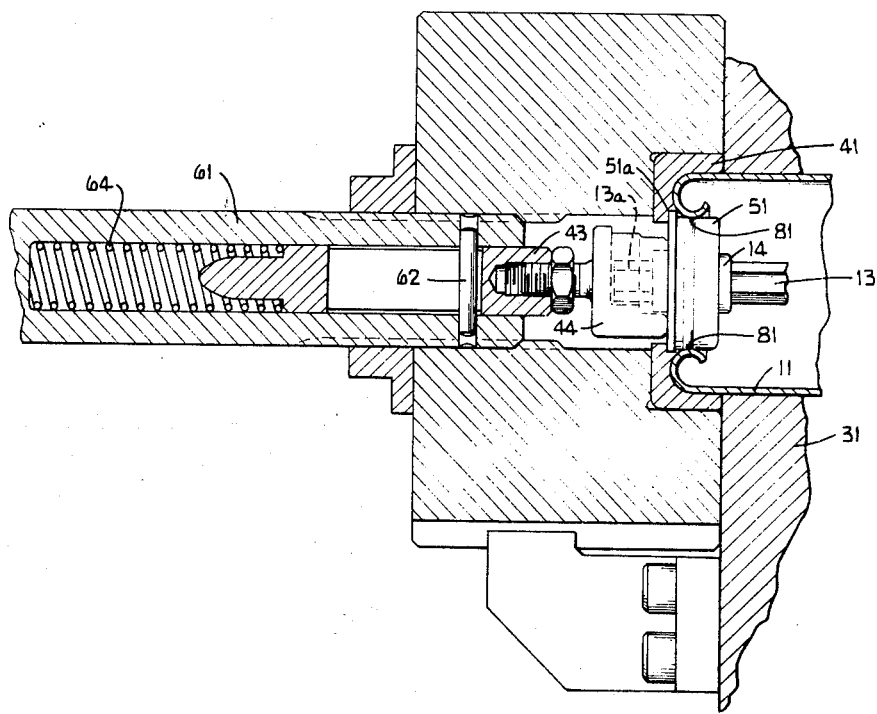

PATENTED NOV 20 1973 3,772,751

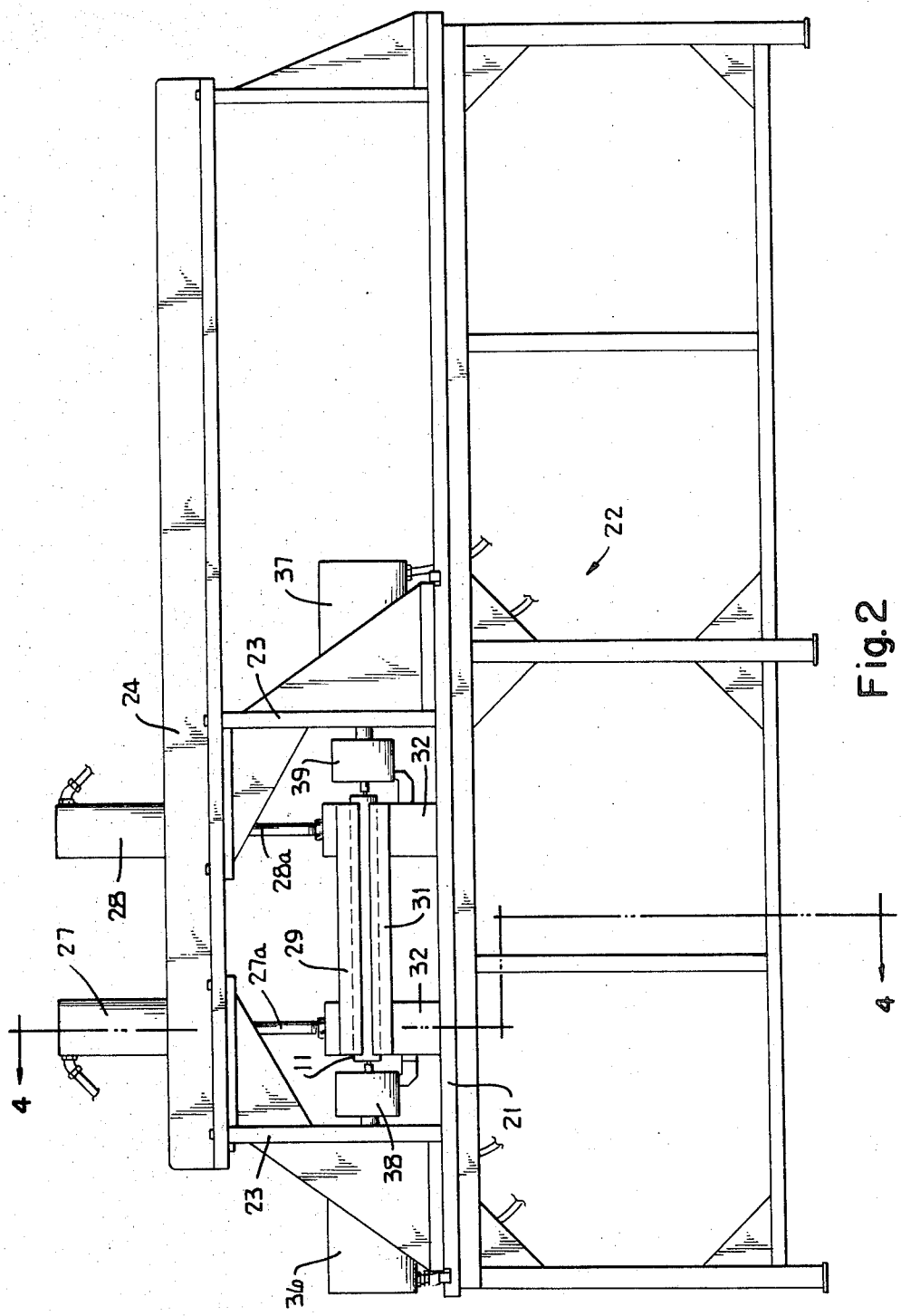

CONVEYOR ROLLER ASSEMBLY METHOD AND APPARATUS

BACKGROUND OF THE INVENTION

Both gravity conveyors and powered or live conveyors utilize parallel, spaced rollers. These rollers, conventionally, are composed of a steel tube providing the load engaging surface, and a through shaft. Bearings at each end of the shaft support the tube. The shaft can be moved axially within the bearings a small amount to permit easy insertion or removal of the roller assembly in the conveyor supporting side rails. A compression spring on the shaft urges the shaft to a generally centered position within the tube. Because great numbers of these roller assemblies are used throughout manufacturing, assemblying and warehousing facilities, any simplification of their fabrication or assembly can result in substantial total cost savings. Since the rollers are primarily load bearing members, utilized in environments where huge shock loads (dropping of objects onto the rollers, for example) may occur, alignment of the through-shaft, bearings and tube must be precise and accurate if the rollers are to perform satisfactorily over a prolonged service life. Prior art rollers, and assemblying methods for them, have left something to be desired in this respect.

Conventionally, rollers have been assembled by forming first one end and then the other of the tube component so that the marginal end portions of the tube were reversely folded back upon themselves. The shaft supported bearings are then press-fitted into the inside diameter of the reversely folded portion of the tube. This press-fit connection of the bearing housing to the tube, usually satisfactory for design loads, tends to fail under abnormal loading and shock loads. The failure often occurs because the press-fit permits the shock load to cock or slightly tilt the bearing, and hence the through-shaft, with relation to the tube axis. Rapid loosening or "walking" of the bearing with relation to the tube and shaft then occurs, quickly resulting in failure of the roller assembly. Such conveyor system break-downs are usually quite serious since the proper operation of a series of production processes normally depends upon the uninterrupted functioning of the conveyor system.

The method and apparatus of the present invention provides for forming both ends of the tube simultaneously while the bearings are in place on the shaft. The shaft, tube and bearings are maintained in coaxial relation, and the reversely folded portions of the tube are made to enter or penetrate the material of the bearing housings so that the bearings are permanently joined to the tube ens by the same motion of the forming dies that provides the reverse bend of the marginal portions of the tube. Proper alignment of the whole assembly and permanent locking of the bearings (as distinguished from the conventional press-fit method) to the tube ends is thus achieved.

BRIEF DESCRIPTION OF THE DRAWINGS

FIG. 2 is a side view of the forming apparatus embodying the present invention.

DESCRIPTION OF THE PREFERRED EMBODIMENT

Figure 1:
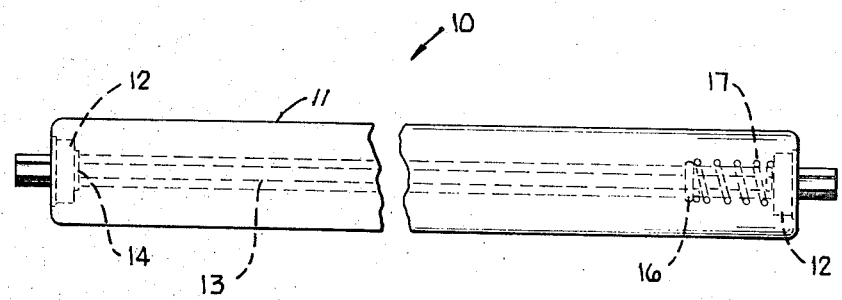
FIG. 1 is a side view of a conventional conveyor roller of the type formed by the method and apparatus of the present invention.

Referring initially to FIG. 1, the conventional conveyor roller indicated generally at 10 may be seen to be composed of an outer steel tube 11 supporting bearings 12 adjacent each of its ends, the bearings providing support for a through-shaft 13 which may have a hexagonal configuration. The shaft is provided with an upset collar 14 adjacent one of its ends which locates the adjacent bearing 12. At its opposite end the shaft is provided with a collar 16 on which the inner end of a compression spring 17 is bottomed. The opposite end of the spring 17 bears against the adjacent housing of the bearing 12, it being understood that the hexagonal shaft 13 can be moved axially within the central aperture of the bearing. The presence of the compression spring 17 permits the shaft 13 to be moved or shifted slightly to the right, as viewed in FIG. 1, compressing the spring 17 and permitting the roller assembly to be conveniently aligned and placed in the mounting holes in a track structure (not shown). The general form of the roller construction described above is conventional, including the spring arrangement for retracting one end of the hexagonal shaft, and the structure of the present invention, together with the method utilized, provide an improved means for fabricating or assemblying the components of the roller, particularly the alignment and locking of the bearing housings in the roller ends.

Figures 3, 4:
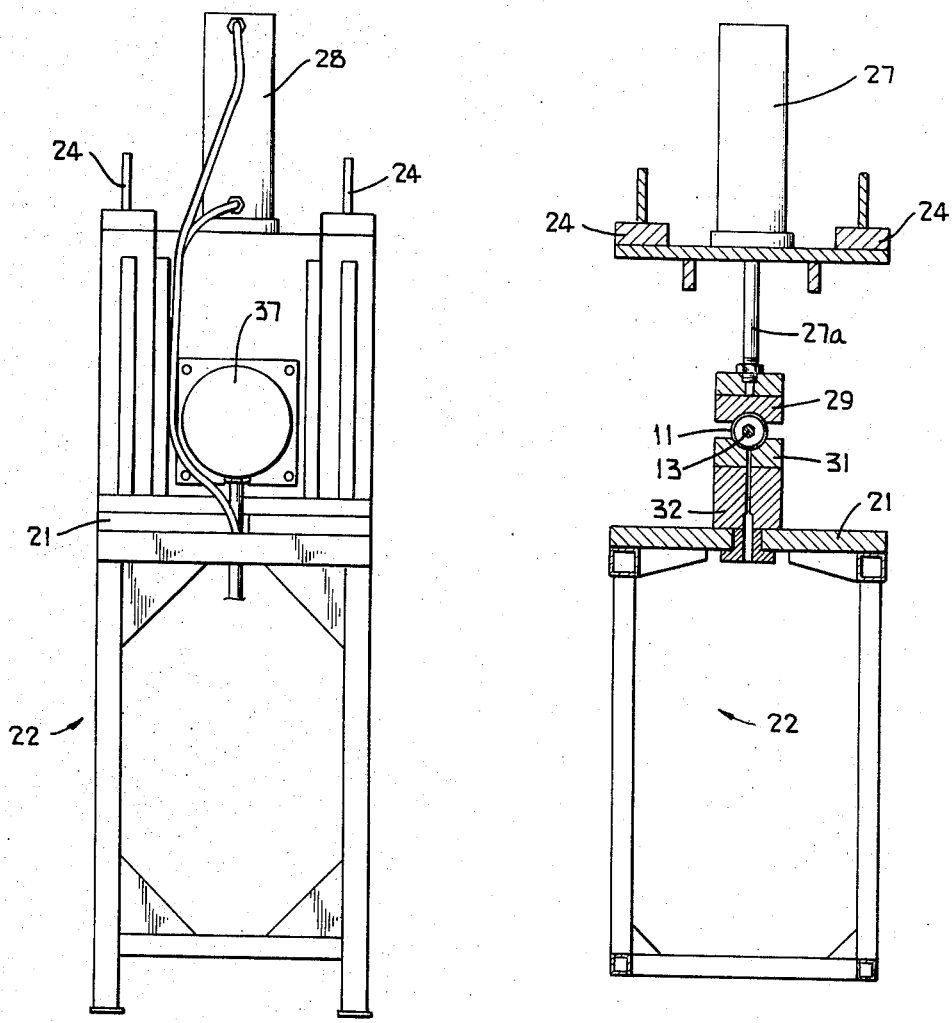
FIG. 3 is an end view of the structure shown in FIG. 2.
FIG. 4 is a sectional view taken generally along the line 4—4 of FIG. 2.

Referring now primarily to FIGS. 2 and 3, the apparatus for forming the roller includes a platform 21 supported on an underframe indicated generally at 22. Vertical, gussetted support members 23 extend upwardly from the platform and support parallel members 24. Supported on plates spanning the support members 24 are hydraulic cylinders 27 and 28 which are subject to controlled pressurizing and depressurizing from a source of hydraulic fluid under pressure not shown. The thrust rods 27a and 28a of the hydraulic cylinders serve to support and move an upper clamping member 29. The clamping member 29 is provided with a curved or concave lower surface which, when the member 29 is in lowered position, encloses the upper curved surface of the tube component 11 of the roller prior to the forming of its ends.

Underlying the movable clamping member 29 is a lower, stationary clamping member 31 which is supported by members 32 extending upwardly from the platform 21. The upper surface of the clamping member 31 is concave and receives the underside of the tube component 11. The curvature of the opposed faces of the clamping members 31 and 29 will be evident from FIG. 4.

Supported on the platform 21 are further hydraulic cylinders or power elements identified at 36 and 37

(FIG. 2) these power units serve to move horizontally the movable head structures 38 and 39, respectively.

Figure 5:
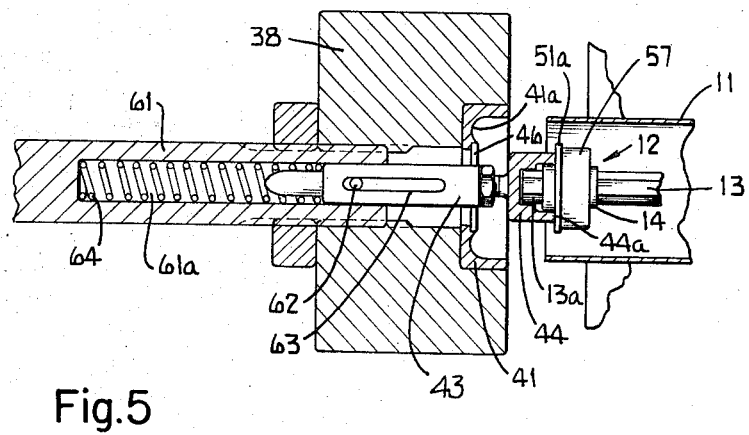
FIG. 5 is a fragmentary, top plan view of a portion of the structure shown in FIG. 2.
Figure 6:
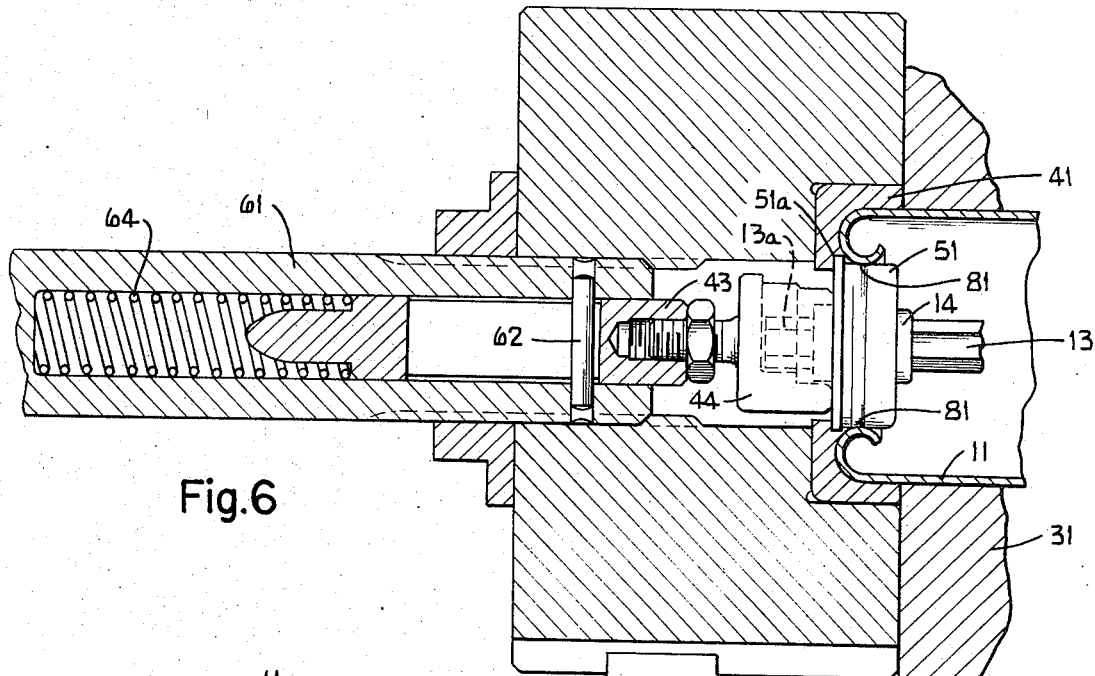
FIG. 6 is a fragmentary side view of the structure shown in FIG. 5 but with the forming die closed against the tube component of the roller.
Figure 7:
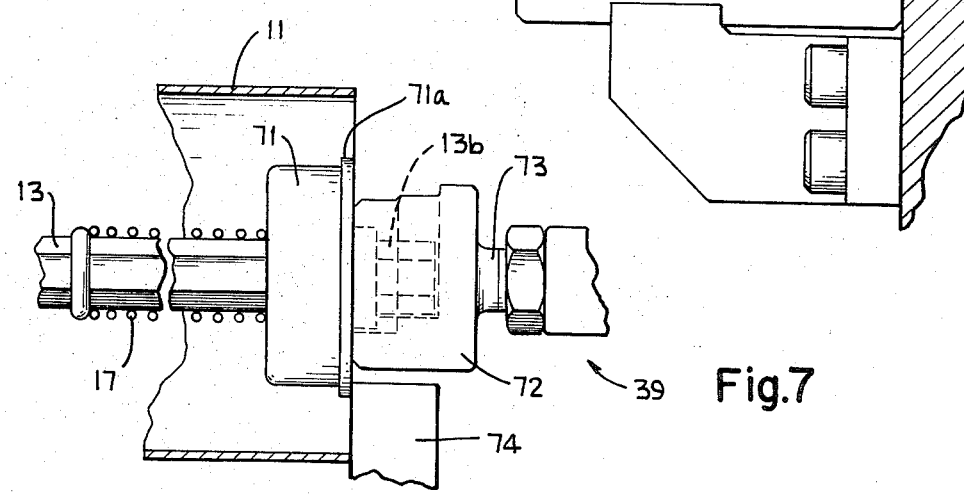
FIG. 7 is a view similar to FIG. 6 but showing the opposite end of the tube component of the roller prior to closing of the movable forming die.

The movable heads 38 and 39 are shown in detail in FIGS. 5, 6 and 7. Referring to FIG. 5, the movable head 38 may be seen to include a forming die 41 whose end surface has a smoothly curved, concave annular configuration which is arcuate in cross section, the surface described being identified at 41a. Extending centrally through the forming die is a shaft 43 which at its end carries a generally cup-shaped holder 44. The holder is adapted to accommodate the end 13a of the hexagonal shaft 13 and the annular end surface 44a of the holder is adapted to engage the side face of the circular bearing housing 51 which encloses the shaft bearing 12 previously mentioned with reference to FIG. 1. As may be seen in FIG. 6 the holder member 44 is open at its upper surface to permit the end 13a of the shaft 13 to be dropped into the holder conveniently. At the inner margin of the surface 41a on the die 41 there is machined an annular shoulder 46 which, as may best be seen in FIG. 6 engages the flange 51a on the bearing housing 51 when the die is closed against the tube 11. The shaft 43 has a lost-motion connection with the thrust shaft 61 of the hydraulic cylinder 36 (FIG. 2), the lost-motion connection being established by the pin 62 which extends into the slot 63 of the shaft 43, the pin 62 being carried by the shaft 61. The shaft 43 fits within a central, blind bore 61a in the shaft 61 and a compression spring 64 urges the shaft 43 outwardly with respect to the shaft 61 to the limit defined by the pin 62 and the slot 63, all as shown in FIG. 5. As the head 38 is moved toward the end of the tube 11, closing the die against the tube, it will be evident that the holder 44 will move leftwardly with relation to the head 38 as illustrated in FIG. 6.

Referring to FIG. 7, the opposite end of the tube 11 and a shaft 13 are shown, the shaft carrying the circular bearing housing 71 which is identical to the bearing assembly 51 previously described with reference to FIG. 5. The bearing housing 71, enclosing the right hand bearing 12 (as viewed in FIG. 1) is provided with an annular flange 71a which fits within the shoulder formed in the movable die carried by the movable head 39 (FIG. 2), the die carried by the head 39 being identical to the die 41 described with reference to FIG. 5 and, therefore, not illustrated in detail in FIG. 7. The end 13b of the shaft 13 is received in a holder 72, which corresponds to the holder 44 of FIG. 5, and the holder is carried by a shaft 73, extending centrally through the adjacent die and corresponding to the shaft 43 of FIG. 5. A movable stop 74 extends into engagement with the tube end and with the end of the bearing housing 71 to act as a locator for the bearing with relation to the tube prior to closing of the dies. The stop is carried by the upper clamping member 29 (FIG. 2) and moves downwardly out of engagement with the bearing housing and tube end as the clamping member 29 is moved downwardly into position and prior to horizontal closing movement of the heads 37 and 38.

In operation, an unformed tube 11 is placed in the lower clamping member 31 and the shaft of the roller assembly 13, carrying bearings 12 is placed between the shaft holding members 44 and 72 of the apparatus. Under these conditions, the components will be in the position shown in FIG. 5 as to the left-hand end of the assembly and in the position shown in FIG. 7 with respect to the right-hand end of the assembly. The power elements 27 and 28 are then acutated to lower the clamping member 29 against the tube thereby clamping the tube in coaxial relation with the shaft held by the members 44 and 72. Under these conditions, the bearing housings 51 and 71 for the bearings 12 will be located inwardly or within the unformed tube ends as will be evident from FIGS. 5 and 7. The power elements 36 and 37 are then actuated to move the heads 38 and 39 toward each other, with the shafts 43 and 73 retreating into the respective thrust rods of the hydraulic cylinders 36 and 37 as will be evident from FIG. 6.

As the movable heads advance the dies (the left hand die being identified at 41 in FIG. 6) toward the tube ends, the end marginal portion of the tube will be formed to the curved configuration 41a of the die. During this closing movement the presence of the shoulder 51a on the bearing housing and its seating in the groove 46 in the die prevents the bearing from being snapped axially off the shaft 13 as the forming continues. The dimensioning of the forming die is such that as the end of the tube 11 assumes its reverse, inwardly curved configuration it enters slightly the material forming the bearing housing as indicated at 81 in FIG. 6. Because the inside diameter of the reversely formed portion of the tube is somewhat less than the outside diameter of the bearing housing 51, the entry of the tube end portion into the material of the bearing housing as the tube is formed serves to permanently join or lock the bearings in place with respect to the tube ends. The horizontal motion of the heads 38 and 39 toward each other to close the dies is self centering, and, the hydraulic cylinders 36 and 37 are actuated from a unitary fluid pressure source. Both bearings 12 at opposite ends of the shaft 13 are thus locked to the adjacent tube ends simultaneously as the tube ends are given there characteristic inwardly formed configuration and since the shaft 13 and tube 11 are, during the forming operation, clamped securely in coaxial relation, the bearings, shaft and tube are in proper position with respect to each other at the end of the forming operation. Both ends of the roller assembly are formed simultaneously and during the forming operation the bearings are fixed or permanently locked to the tube ends. The bearings are locked to the tube while positioned within the tube and are not pressed or driven into the tube subsequent to its formation.

After the dies have been closed the power elements 36 and 37 may be actuated so as to cause the movable heads to retreat, the movable upper clamping member 29 may be elevated and the formed and assembled conveyor roller may be then removed from the apparatus.

I claim:

1. The method of forming and assemblying a conveyor roller of the type in which a through-shaft is supported by radial-load bearings having a circular housing and mounted at each end of a tube coaxial with the shaft, said method comprising: placing at least one of the bearings at a predetermined position on the shaft and supporting the shaft at its ends, clamping the tube in coaxial relation to the shaft with said bearing adjacent to but inboard of the end margin of the tube, and subsequently engaging said tube end with a forming die and moving the die to smoothly curve the marginal end portion of the tube inwardly upon itself with the inside diameter of the formed tube end being slightly less than the normal outside diameter of the bearing housing, whereby said marginal end portion of the tube is formed and the bearing is permanently joined to the tube in a single forming motion.

2. A method of forming and assemblying a conveyor roller as claimed in claim 1 but comprising the additional steps of placing a second bearing on the shaft at a predetermined position adjacent the opposite end of the shaft but inboard of the end margin of the tube, and subsequently engaging both tube ends with forming dies and moving the dies toward each other to simultaneously smoothly curve both marginal end portions of the tube inwardly upon themselves with the inside diameter of both formed tube ends being slightly less than the normal outside diameter of the bearing housings, whereby the marginal end portions of the tube are simultaneously formed and both of the bearings are permanently joined to the tube by a single forming motion of each of said dies.

3. A method of forming and assemblying a conveyor roller as claimed in claim 2 including the additional step of providing an annular shoulder on each of the circular bearing housings for preventing displacement of the bearings as the inwardly moving, tube ends pass over the bearing housings during the forming operation.

4. An apparatus for forming and assemblying a conveyor roller of the type in which a through-shaft is supported by radial-load bearings having circular housing and mounted at each end of a tube coaxial with the shaft, said apparatus comprising: means for clamping the conveyor tube and through-shaft in coaxial relation with bearings on the shaft adjacent each end of the tube, forming dies mounted for opposed movement parallel to said tube and shaft axis and adapted to engage and form both tube ends simultaneously, said dies having a smoothly curved annular surface generally arcuate in cross-section for providing a reverse bend in the marginal area at both tube ends with the inside diameter of the reversely formed tube portion being less than the outside diameter of said bearing housings, whereby the material of the tube enters the material of the bearing housings to permanently join them to the tube during the reverse bend forming motion of said dies.

5. An apparatus as claimed in claim 4 in which said clamping means includes a stationary block having a curved surface accommodating a portion of the outer surface of the tube and a moveable block having a curved surface accommodating a diametrically opposite portion of the tube outer surface, and means for closing the moveable block toward the stationary block to clamp the tube parallel to the direction of motion of the forming dies.

6. An apparatus as claimed in claim 5 in which said clamping means further includes holders adapted to accommodate opposite ends of said shaft, each of said holders extending centrally through the adjacent forming die for supporting the shaft coaxially with said tube.

7. An apparatus as claimed in claim 6 in which said holders have a spring-loaded lost motion connection with said forming dies to thereby limit the axial force applied to said shaft by said holders as said forming dies close toward each other in their forming motion.

* * * * *